(12) United States Patent
Zhu

(10) Patent No.: US 8,936,229 B2
(45) Date of Patent: Jan. 20, 2015

(54) HOUSING ASSEMBLY AND ELECTRONIC DEVICE USING THE SAME

(71) Applicant: ScienBiziP Consulting (Shenzhen) Co., Ltd., Shenzhen (CN)

(72) Inventor: Hong-Wei Zhu, Shenzhen (CN)

(73) Assignee: ScienBiziP Consulting (Shenzhen)Co., Ltd., Guangdong (CN)

( * ) Notice: Subject to any disclaimer, the term of this patent is extended or adjusted under 35 U.S.C. 154(b) by 0 days.

(21) Appl. No.: 14/059,468

(22) Filed: Oct. 22, 2013

(65) Prior Publication Data

US 2014/0174960 A1 Jun. 26, 2014

(30) Foreign Application Priority Data

Dec. 24, 2012 (CN) .......................... 2012 1 0565372

(51) Int. Cl.
*A47G 29/00* (2006.01)
*F16M 11/00* (2006.01)
(52) U.S. Cl.
USPC ........................................................ 248/688
(58) Field of Classification Search
USPC .......... 248/917–923, 688, 682, 685, 686, 371
See application file for complete search history.

(56) References Cited

U.S. PATENT DOCUMENTS

| 5,135,273 | A  | * | 8/1992 | MacCalder | 292/338 |
| 7,762,518 | B2 | * | 7/2010 | Ogawa et al. | 248/688 |
| 8,540,205 | B2 | * | 9/2013 | Zhang et al. | 248/688 |
| 8,767,395 | B2 | * | 7/2014 | Yoo | 361/679.56 |
| 2010/0171671 | A1 | * | 7/2010 | Park | 343/720 |
| 2011/0164358 | A1 | * | 7/2011 | Duan et al. | 361/679.01 |

\* cited by examiner

*Primary Examiner* — Amy J Sterling
(74) *Attorney, Agent, or Firm* — Novak Druce Connolly Bove + Quigg LLP

(57) ABSTRACT

A housing assembly for an electronic device is provided. The housing assembly includes a protective shell and a support leg. The protective shell defines an opening, a flat panel, a baffle, and a protrusion formed on the baffle and opposing the protective shell. Both the baffle and the flat panel are deformable. The support leg is rotatable relative to the protective shell in an opening between a folded position where the support leg is parallel with and attached to the protective shell, the slanted lower surface is attached to the protrusion; and a deployed position where the support leg is inclined relative to the protective shell, and the slanted lower surface is attached to the protective shell and the flat upper surface is opposite to the protrusion.

14 Claims, 8 Drawing Sheets

HOUSING ASSEMBLY AND ELECTRONIC DEVICE USING THE SAME

BACKGROUND

1. Technical Field

The present disclosure relates to support assemblies and, more particularly, to a housing assembly used for an electronic device.

2. Description of Related Art

Electronic devices may include a stand to support the electronic device, such as a mobile phone or a digital photo frame. One common type of stand usually includes a leg which is pivotally hinged about a shaft. This type of stand usually also includes a fixing structure to keep the leg in the first position and/or the second position. One fixing structure is simply achieved via the frictional force between the leg and the hinge to which the leg is attached.

Although this type of stand with these fixing structures work up to the expectations, a stand with a steady fixing structure is still needed.

DETAILED DESCRIPTION

Figure 1:
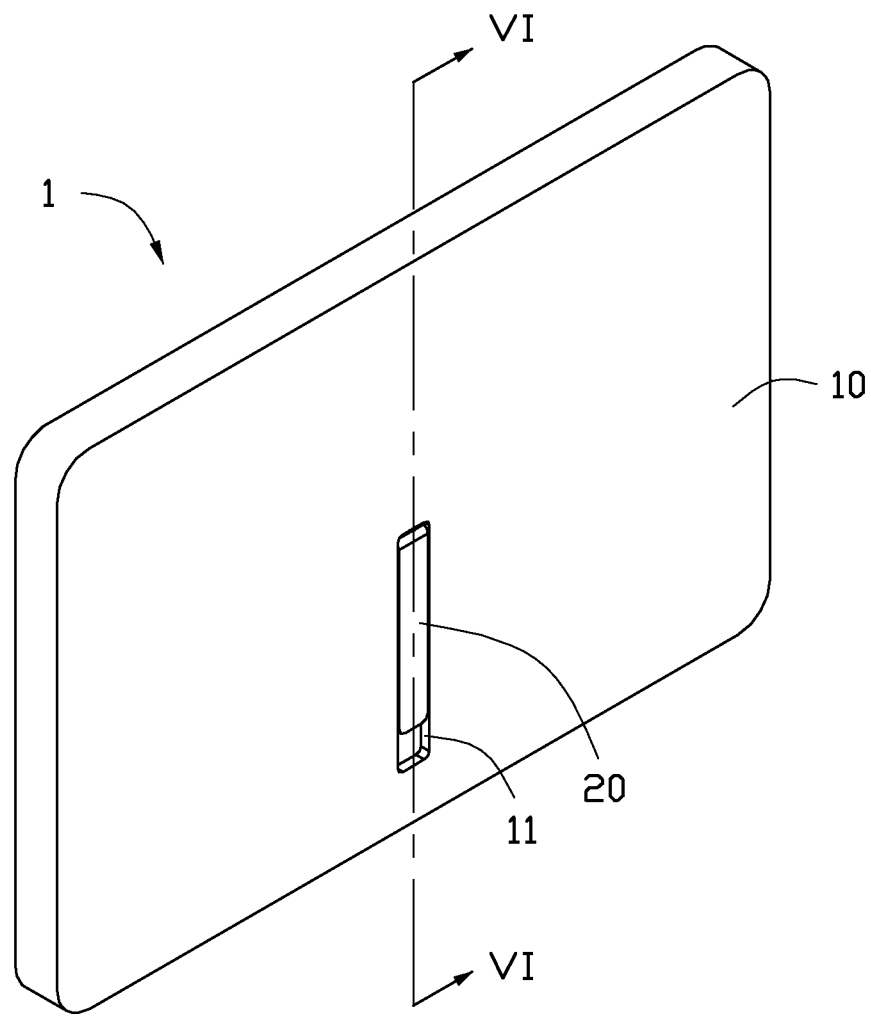
FIG. 1 is an isometric view of a stand in accordance with an exemplary embodiment of the present disclosure, which shows the stand in a folded position.
Figure 2:
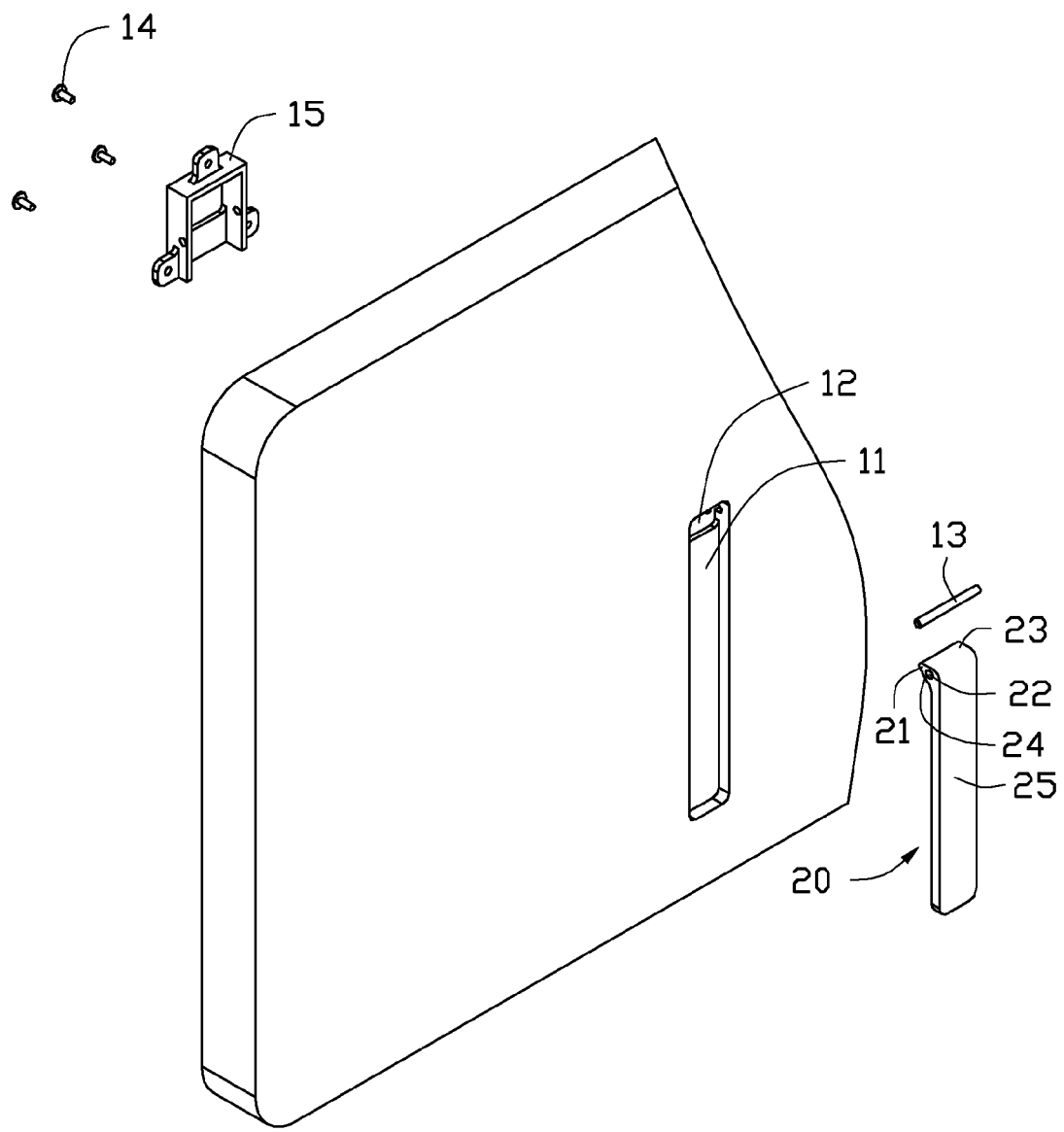
FIG. 2 is a partial and exploded view of the stand of FIG. 1 based on a first angle.
Figure 3:
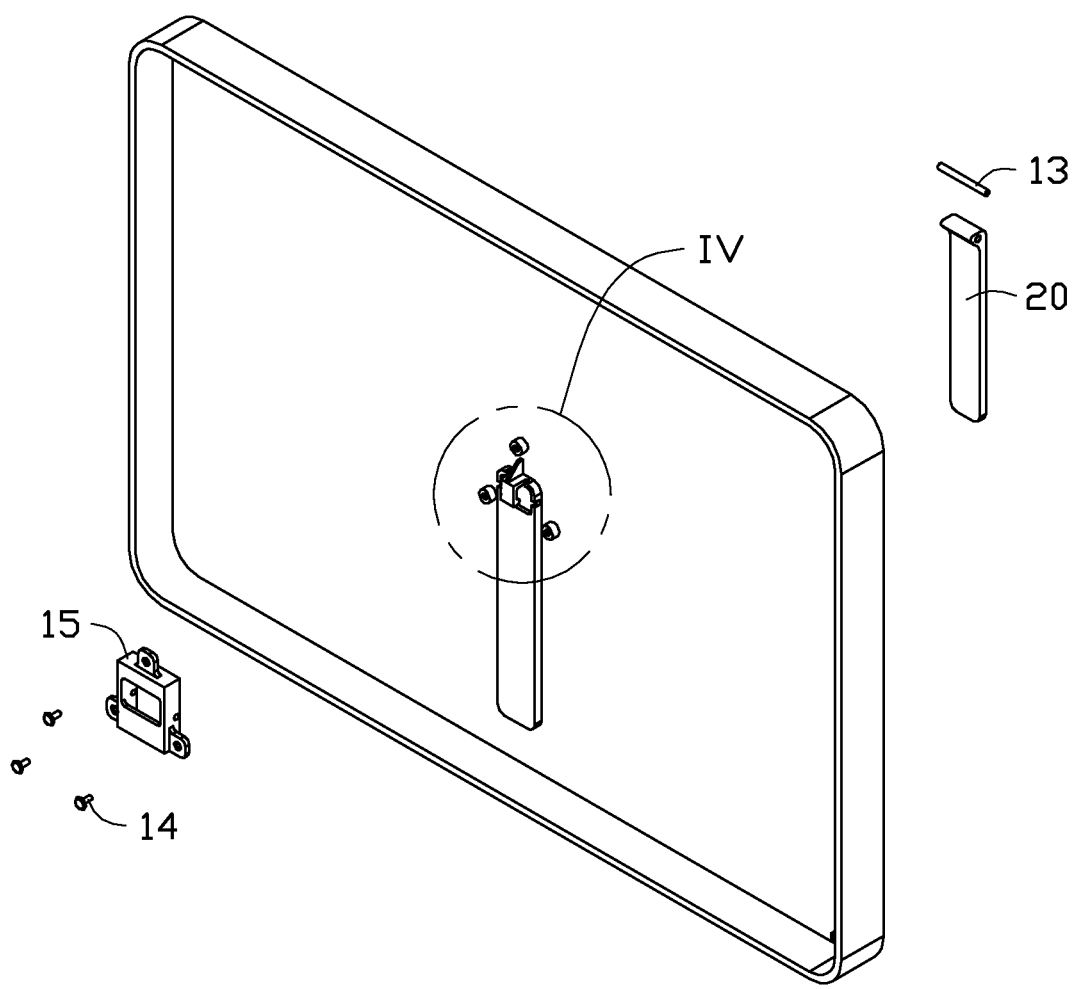
FIG. 3 is a partial and exploded view of the stand of FIG. 1 based on a second angle.
Figure 4:
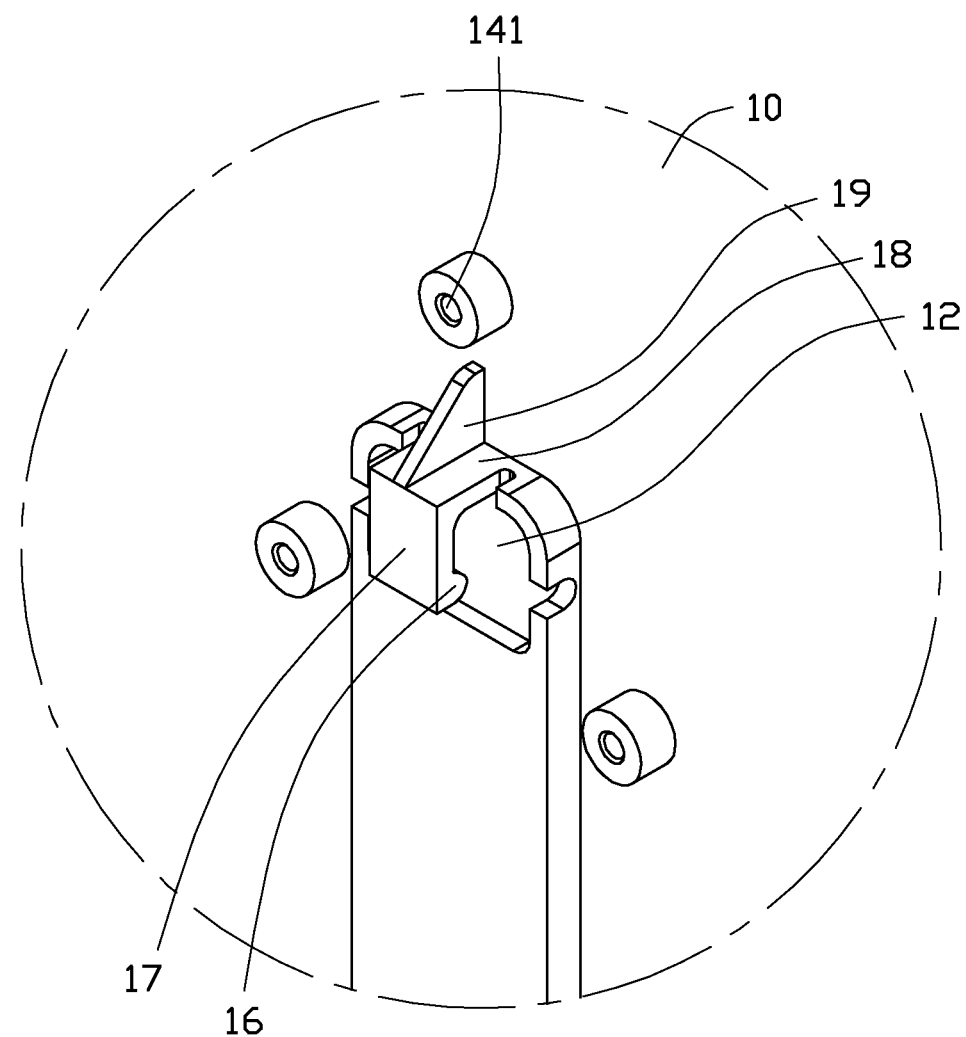
FIG. 4 is a partial, enlarged, isometric view of the stand of FIG. 3.
Figure 5:
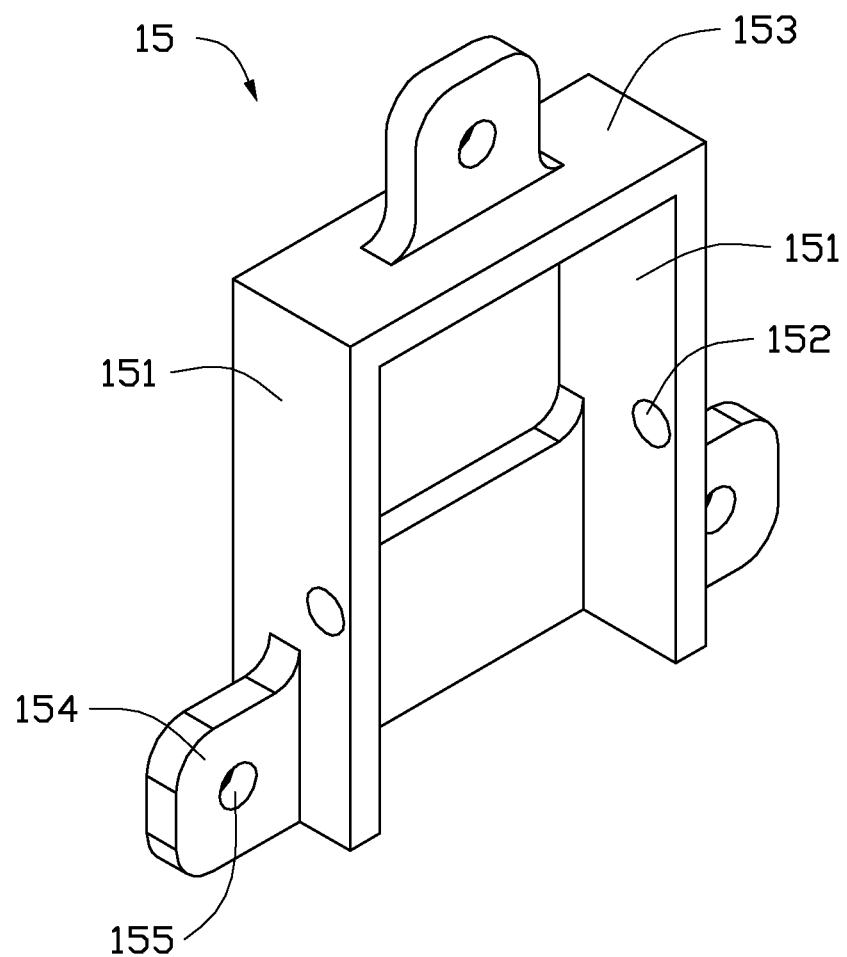
FIG. 5 is an enlarged view of a connection member of the stand of FIG. 2.
Figure 6:
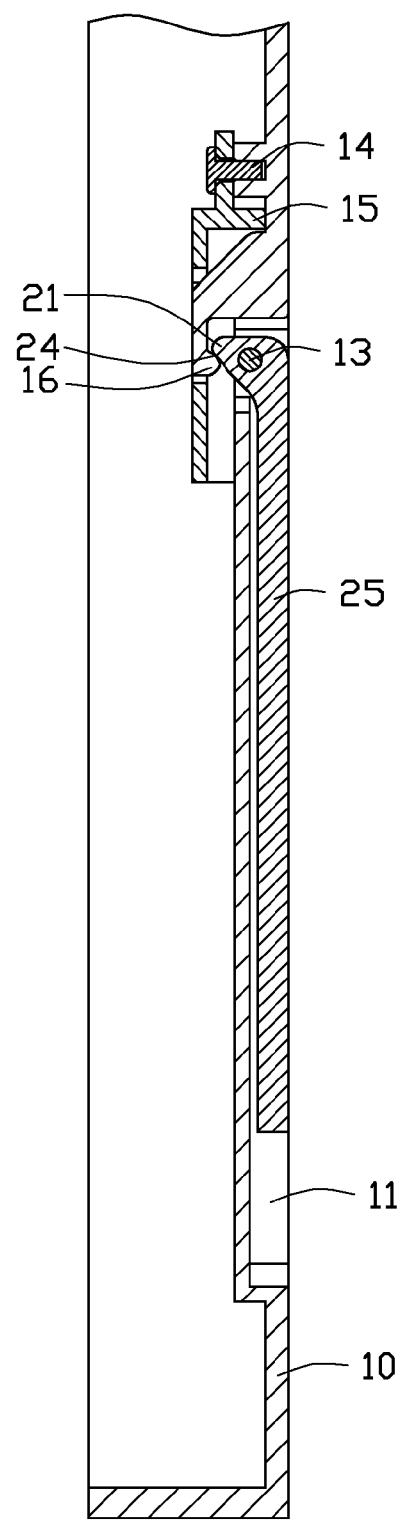
FIG. 6 is a partial, enlarged, sectional view of the stand of FIG. 1.
Figure 8:
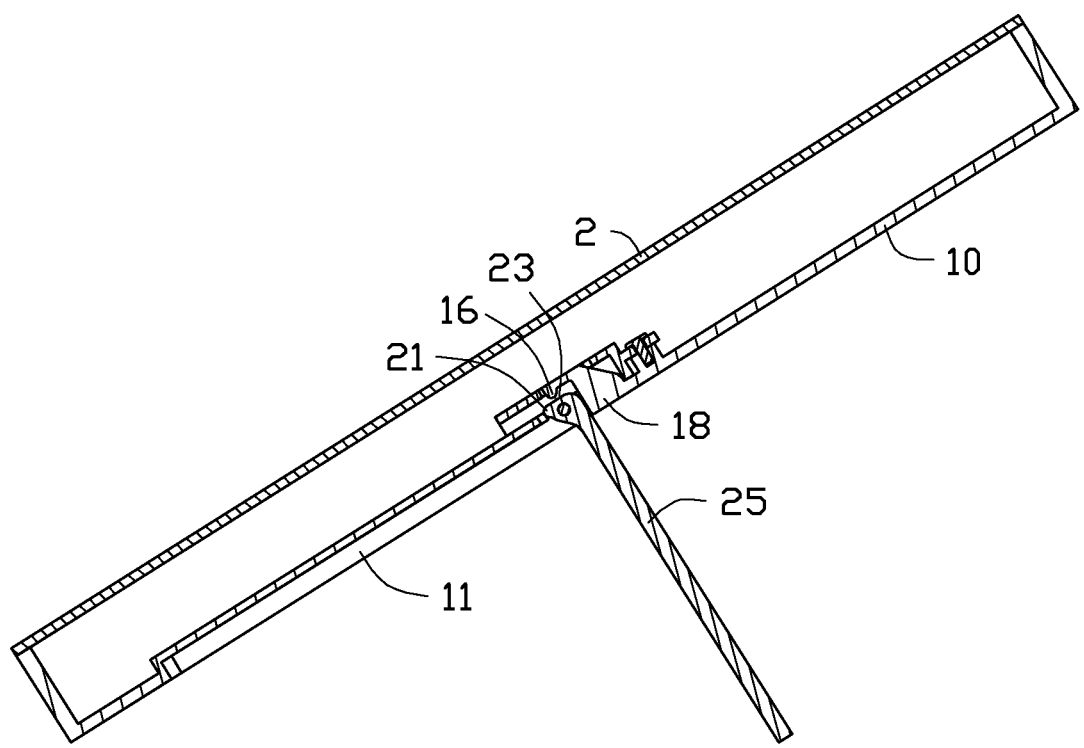
FIG. 8 is a partial, enlarged, sectional view of the stand of FIG. 1, which shows the stand in a second deployed position.

FIG. 1 shows a stand 1 in accordance with an exemplary embodiment of the present disclosure. The stand 1 is utilized to support an electronic device (not shown). The electronic device may be a mobile phone or a digital photo frame, for example. The stand 1 includes a protective shell 10 for encasing a back cover of the electronic device and a leg 20 connected with the protective shell 10. FIGS. 1 and 6 show that the leg 20 is in a folded position, and FIG. 8 shows that the leg 20 is in deployed positions.

FIGS. 2 through 5 show that the leg 20 is integrally formed, and includes a main body 25 and a projection 21. The main body 25 is a thin sheet. The projection 21 perpendicularly extends from an upper end of the main body 25. A lower end of the main body 25 is flat. A through hole 22 is formed on the projection 21. In the embodiment, the through hole 22 is circular. The projection 21 includes a flat upper surface 23 perpendicular to the main body 25 and a slanted lower surface 24.

In the embodiment, a recess 11 is defined in an outer surface of the protective shell 10 for receiving the leg 20. In the embodiment, a thickness of the main body 25 is equal to a depth of the recess 11. Thereby both the leg 20 and the protective shell 10 are level. A length of the leg 20 is less than a length of the recess 11, so that, when the leg 20 is received in the recess 11, the lower end of the leg 20 can be operated manually.

An opening 12 are defined on the top of the recess 11. A flat panel 18 extends from an upper end of the recess 11 and is perpendicular to the protective shell 10. A rib 19 extends from an outer surface of the flat panel 18 and is perpendicular to the flat panel 18. The rib 19 is fixed on the protective shell 10. A baffle 17 extends from a side of the flat panel 18 and is perpendicular to the flat panel 18. A protrusion 16 is formed on the baffle 17 and opposite to the recess 11. The baffle 17 is integrally formed with the flat panel 18. Both the baffle 17 and the flat panel 18 are deformable. When an external force is utilized for the baffle 17 and the flat panel 18, both the baffle 17 and the flat panel 18 are deformed.

At least three base rings 141 are fixed on the protective shell 10. A connecting member 15 is pivotably mounted on the protective shell 10 through the base rings 141. The connecting member 15 includes two opposite parallel walls 151 and a wall 153 perpendicular to the two walls 151. Each of the two walls 151 and the wall 153 defines an ear 154 extending from an outer surface, respectively. Each ear 154 defines a threaded hole 155 opposite to the protective shell 10. The stand 1 further includes at least three screws 14. Each screw 14 passes through the threaded hole 309 and the base ring 305 to connect the connecting member 15 to the protective shell 10, thereby the connecting member 15 is fixed on the protective shell 10.

The two opposite parallel walls 151 respectively define two opposite holes 152. In the embodiment, the hole 152 is a through one and circular. In another embodiment, the hole 152 is a blind one. The stand 1 further includes a shaft 13 which passes through the through hole 22 and is engaged in the two opposite holes 152, thereby the leg 20 can rotate round the shaft 13.

Figure 7:
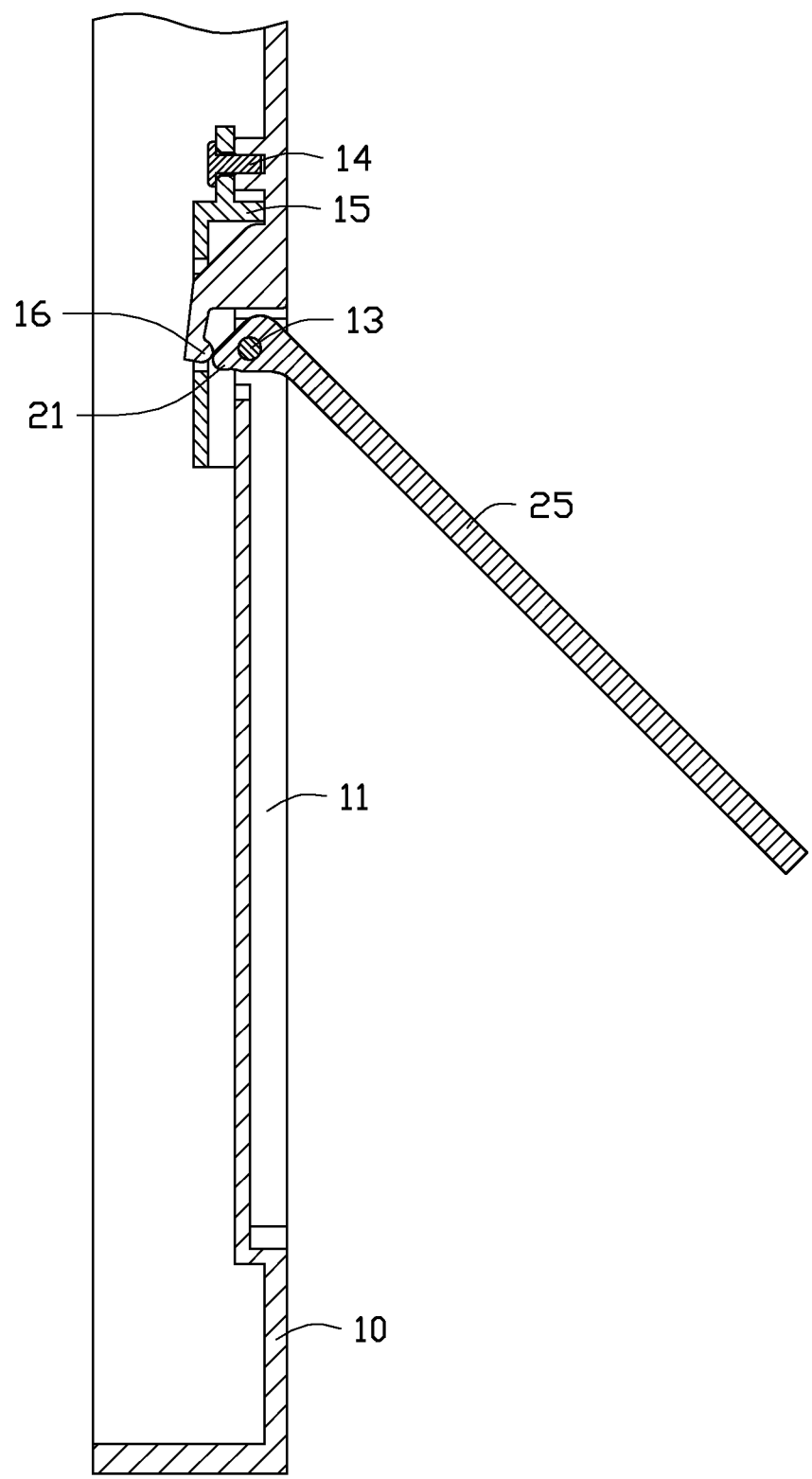
FIG. 7 is a partial, enlarged, sectional view of the stand of FIG. 1, which shows the stand in a first deployed position.

FIGS. 1 and 6 show that when the leg 20 is in the folded position, the slanted lower surface 24 is attached to the protrusion 16 and the leg 20 is retained in a first position. FIG. 7 shows that when a horizontal external force is exerted on the leg 20, the lower end of the leg 20 is distanced from the protective shell 10 and the projection 21 rotates round the shaft 13 in the opening 12 and resists the protrusion 16, and both the flat panel 18 and the baffle 17 are deformed. FIG. 8 shows that when the projection 21 rotates at 90 degrees round the shaft 13, the flat upper surface 23 rotates in the opening 12 and is opposite to the protrusion 16. The slanted lower surface 24 is attached to the protective shell 10 and the leg 20 is retained in a second position, both the flat panel 18 and the baffle 17 are restored. In addition, the lower end of the leg 20 can be placed on a horizontal surface, such as a desktop.

Therefore, the leg 20 is rotatable relative to the protective shell 10 between a folded position where the leg is parallel with and attached to the protective shell 10. The projection 21 resists the protrusion 16 in FIG. 1; when the leg 20 is rotated, both the flat panel 18 and the baffle 17 are deformed, and a deployed position where the leg is inclined relative to the protective shell 10, and the projection 21 resists the protective shell 10 in FIG. 8.

While one embodiment has been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A housing assembly for an electronic device, comprising:
   a protective shell for fittingly encasing the electronic device, the protective shell defining an opening,
   a flat panel perpendicularly formed on the protective shell adjacent to the opening,
   a baffle perpendicularly extending from a side of the flat panel,
   a protrusion formed on the baffle and opposing the protective shell, wherein both the baffle and the flat panel are deformable;
   a support leg comprising a main body and a projection extending from an upper end of the main body, wherein the projection defines a through hole, and the projection comprises a flat upper surface perpendicular to the main body and a slanted lower surface;
   a connecting member fixed on the protective shell, the connecting member comprising two opposite parallel walls, the two parallel walls respectively defining two opposite holes, wherein when the support leg rotates, both the flat panel and the baffle are deformed; and
   a shaft passing through the through hole and engaged in the two opposite holes;
   wherein the support leg is rotatable relative to the protective shell in the opening between a folded position where the support leg is parallel with and attached to the protective shell, the slanted lower surface is attached to the protrusion; and a deployed position where the support leg is inclined relative to the protective shell, and the slanted lower surface is attached to the protective shell and the flat upper surface is opposite to the protrusion.

2. The housing assembly according to claim 1, wherein the baffle is integrally formed with the flat panel.

3. The housing assembly according to claim 1, wherein a recess is defined in an outer surface of the protective shell for receiving the support leg when the support leg is in the folded position.

4. The housing assembly according to claim 3, wherein a length of the support leg is less than a length of the recess, and when the support leg is received in the recess, the lower end of the support leg is accessible by a user finger.

5. The housing assembly according to claim 1, wherein a rib extends from an outer surface of the flat panel and is perpendicular to the flat panel, and the rib is fixed on the protective shell.

6. The housing assembly according to claim 1, wherein at least three base rings are fixed on the protective shell and the connecting member is mounted on the protective shell through the base rings.

7. The housing assembly according to claim 6, wherein the connecting member further comprises a wall perpendicular to the two opposite parallel walls, each wall defines an ear extending from an outer surface thereof, each ear defines a threaded hole opposite to the protective shell, the housing assembly further comprises at least three screws, each screw passes through the threaded hole and the base ring to connect the connecting member to the protective shell.

8. An electronic device assembly comprising:
   an electronic device;
   a housing assembly comprising:
      a protective shell for fittingly encasing the electronic device, the protective shell defining an opening,
         a flat panel perpendicularly formed on the protective shell adjacent to the opening, a baffle perpendicularly extending from a side of the flat panel,
   a protrusion formed on the baffle and opposing the protective shell, wherein both the baffle and the flat panel are deformable;
      a support leg comprising a main body and a projection extending from an upper end of the main body, wherein the upper end of the main body defines a through hole, and the projection comprises a flat upper surface substantially perpendicular to the main body and a slanted lower surface;
      a connecting member fixed on the protective shell, the connecting member comprising two opposite parallel walls, the two parallel walls respectively defining two opposite holes, wherein when the support leg rotates, both the flat panel and the baffle are deformed; and
      a shaft passing through the through hole and inserted into the two opposite holes;
   wherein the support leg is rotatable relative to the protective shell in the opening between a folded position where the support leg is parallel with and attached to the protective shell, the slanted lower surface is attached to the protrusion; and a deployed position where the support leg is inclined relative to the protective shell, and the slanted lower surface is attached to the protective shell and the flat upper surface is opposite to the protrusion.

9. The electronic device according to claim 8, wherein the baffle is integrally formed with the flat panel.

10. The electronic device according to claim 8, wherein a recess is defined in an outer surface of the protective shell for receiving the support leg when the support leg is in the folded position.

11. The electronic device according to claim 10, wherein a length of the support leg is less than a length of the recess, and when the support leg is received in the recess, the lower end of the support leg is accessible by a user finger.

12. The electronic device according to claim 8, wherein a rib extends from an outer surface of the flat panel and is perpendicular to the flat panel, and the rib is fixed on the protective shell.

13. The electronic device according to claim 8, wherein at least three base rings are fixed on the protective shell and the connecting member is mounted on the protective shell through the base rings.

14. The electronic device according to claim 13, wherein the connecting member further comprises a wall perpendicular to the two opposite parallel walls, each wall defines an ear extending from an outer surface thereof, each ear defines a threaded hole opposite to the protective shell, the housing assembly further comprises at least three screws, each screw passes through the threaded hole and the base ring to connect the connecting member to the protective shell.

* * * * *